(12) United States Patent
Berg et al.

(10) Patent No.: US 6,568,758 B1
(45) Date of Patent: May 27, 2003

(54) LINEAR RECLINER ASSEMBLY HAVING BIAS CAM MECHANISM

(75) Inventors: Alan D. Berg, Romeo, MI (US); David L. Robinson, Sterling Heights, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 33 days.

(21) Appl. No.: 09/738,304

(22) Filed: Dec. 15, 2000

(51) Int. Cl.[7] .................................................. B60N 2/02
(52) U.S. Cl. ................................... 297/362.12; 297/366
(58) Field of Search ........................ 297/362.12, 361.1, 297/366, 367, 375

(56) References Cited

U.S. PATENT DOCUMENTS

| | | |
|---|---|---|
| 3,288,526 A | 11/1966 | Fiala |
| 4,402,547 A | 9/1983 | Weston et al. |
| 4,668,013 A | 5/1987 | Wahlmann |
| 4,685,735 A | 8/1987 | McFalls et al. |
| 4,880,274 A | 11/1989 | Ichikawa |
| 5,205,609 A | 4/1993 | Notta et al. |
| 5,295,730 A | 3/1994 | Rees |
| 5,322,346 A | 6/1994 | Notta et al. |
| 5,370,443 A | 12/1994 | Maruyama |
| 5,435,624 A | 7/1995 | Bray et al. |
| 5,718,482 A * | 2/1998 | Robinson |
| 5,749,625 A | 5/1998 | Robinson |
| 5,769,493 A | 6/1998 | Pejathaya |
| 5,806,932 A | 9/1998 | Zhuang |
| 5,823,622 A * | 10/1998 | Fisher, IV et al. |
| 5,865,506 A | 2/1999 | Sakamoto |
| 5,871,259 A * | 2/1999 | Gehart |
| 5,979,986 A * | 11/1999 | Pejathaya |
| 5,984,412 A * | 11/1999 | Magyar |
| 6,017,090 A * | 1/2000 | Bonk |
| 6,030,043 A | 2/2000 | Habedank |

\* cited by examiner

Primary Examiner—Milton Nelson, Jr.
(74) Attorney, Agent, or Firm—Harness, Dickey & Pierce, P.L.C.

(57) ABSTRACT

A seat assembly includes a hinge assembly having a linear adjustment mechanism including a recliner rod slidably supported by a housing and a pawl rotatably supported by the housing. The recliner rod preferably has a toothed portion that interfaces with a toothed portion of the pawl to prohibit the recliner rod from sliding. The pawl is pivotable relative the housing such that it may be disengaged to enable the recliner rod to slide freely. When the pawl engages the recliner rod in a locked position, a first force component generally normal to the engagement of the pawl and the recliner rod and a second force component generally through the pawl pivot reduce play and improve the load-carrying capacity of the linear adjustment mechanism.

9 Claims, 6 Drawing Sheets

LINEAR RECLINER ASSEMBLY HAVING BIAS CAM MECHANISM

FIELD OF THE INVENTION

The present invention generally relates to recliner assemblies for seats and more particular to an improved linear recliner assembly for reducing undesirable movement when the assembly is locked.

BACKGROUND OF THE INVENTION

Occupant safety and comfort are paramount concerns for automobile manufacturers. In particular, vehicle seating systems are a significant focus for improved comfort and safety even as manufacturers add more functions and improve versatility of seat assemblies. For example, conventional vehicle seating systems include reclining seats that enable comfort adjustment by a vehicle occupant. As more functions and features are added, manufacturing a reliable, safe, and cost-effective seat assembly becomes an increasing challenge.

In many reclining seats, a linear recliner mechanism includes a recliner rod that reciprocates relative a recliner mechanism housing. The reciprocating recliner rod is pivotally connected at one end to a long lever arm, usually the seatback, against which various forces are applied. The linear recliner mechanism in a vehicle seat is quite small when compared with the length of a seatback, and vehicle vibration or movement of an occupant may impose various forces upon that lever arm during use. Because these forces are applied along such a lengthy lever arm, a large moment is imposed about the recliner rod's pivotal connection to the lever arm, whereby the effects of any variations in the components of the recliner mechanism are magnified. Such play or backlash between the engaging teeth or clearances in the mechanism components allow the seatback to move a miniscule amount even when the mechanism is locked. These small excursions are magnified by the length of the lever arm and become noticeable at the upper end of the seatback. For example, the seatback of an unoccupied seat may tend to oscillate When the vehicle encounters rough road conditions. This magnified play in a recliner mechanism has been termed "chucking" and refers to any manufacturing variation or play in the mechanism components that allows movement of the lever arm or seatback while the mechanism is in a locked condition.

Additionally, as seat assemblies have been improved by automobile manufacturers, increased seatback loading has resulted from seatbelt systems attached to a top portion of the seatback. In the event of an accident, the forward inertia of an occupant's body pulls the seatbelt with an extremely large force. Such a large force on the seatback, acting as a lever arm, results in a significant strain within. the recliner mechanism. As a result, recliner mechanisms used with such "all belts-to-seat" applications (i.e., stand-alone structural seats.) must be sufficiently strong to protect and restrain an occupant during a crash.

Further, as seat assemblies have evolved to include more functions and a greater range of motion, packaging has become a concern. When including a linear recliner mechanism in a seat assembly, a recliner rod that reciprocates relative to the recliner mechanism housing is preferred over a threaded rod that rotates a nut relative the recliner mechanism housing because of these packaging concerns. Also, in such linear recliner mechanisms, an expansion spring is usually mounted coaxially with the recliner rod to bias the seatback to its upright position. Expansion springs generally increase the recliner rod length and limit the packaging options. Further, increased recliner rod length reduces the compressive strength of the recliner rod based upon the principle of column loading.

Therefore, it is desirable in the industry to provide a recliner mechanism that significantly reduces or eliminates chucking of a seat assembly. It is further desirable that such a recliner mechanism be sufficiently strong, providing adequate occupant protection in the event of an accident.

SUMMARY OF THE INVENTION

Generally, the present invention provides an improved linear adjustment mechanism for implementation with a recliner mechanism of a seat assembly. The linear adjustment mechanism directs the forces within the locking mechanism to reduce the overall clearances within the recliner mechanism. One advantage of the present invention is the reduced clearances translate into reduced chucking of the seatback relative to the seat. As a result, overall occupant comfort and safety is increased. Another advantage of the present invention is the improved crash performance of the seat assembly. The linear recliner mechanism's directed forces result in increased strength of the locking members, such that the seatback maintains its position relative to a seat in the event of an accident. This is especially desirable with seatback-mounted seatbelt systems.

To achieve the above described advantages, the present invention provides a linear adjustment mechanism including a bar rack slidably supported in a housing having inner and outer plates. A pawl is pivotably supported between the inner and outer plates for selectively locking the bar rack in one of a plurality of positions relative to the pawl. The pawl is disposed substantially parallel to the bar rack such that in a locked position a linear force applied to the bar rack produces a resultant linear force to the pawl, wherein clearances between the pawl and a pivot of the pawl are reduced.

In a preferred embodiment of the present invention, the linear adjustment mechanism is included in a seat assembly having inner and outer supports and an arm supporting a seatback and rotatably mounted between the inner and outer supports. The arm pivotally interfaces the bar rack such that the arm, and thus the seatback, can be positioned in a plurality of rotatable positions relative to the inner and outer supports, as well as the seat bottom, corresponding to the plurality of positions of the bar rack. Preferably, a return spring biases the arm, and thus the seatback, in a first position corresponding to a dump position of the seatback. Further, the return spring minimizes the length of the bar rack, thus maximizing its column loading strength.

Additional advantages and features of the present invention will become apparent from the subsequent description and the appended claims, taken in conjunction with the accompanying drawings.

BRIEF DESCRIPTION OF THE DRAWINGS

The various advantages of the present invention will become apparent to those skilled in the art by reading the following specification and reference to the drawings in which.

DETAILED DESCRIPTION OF THE PREFERRED EMBODIMENTS

Figure 1:
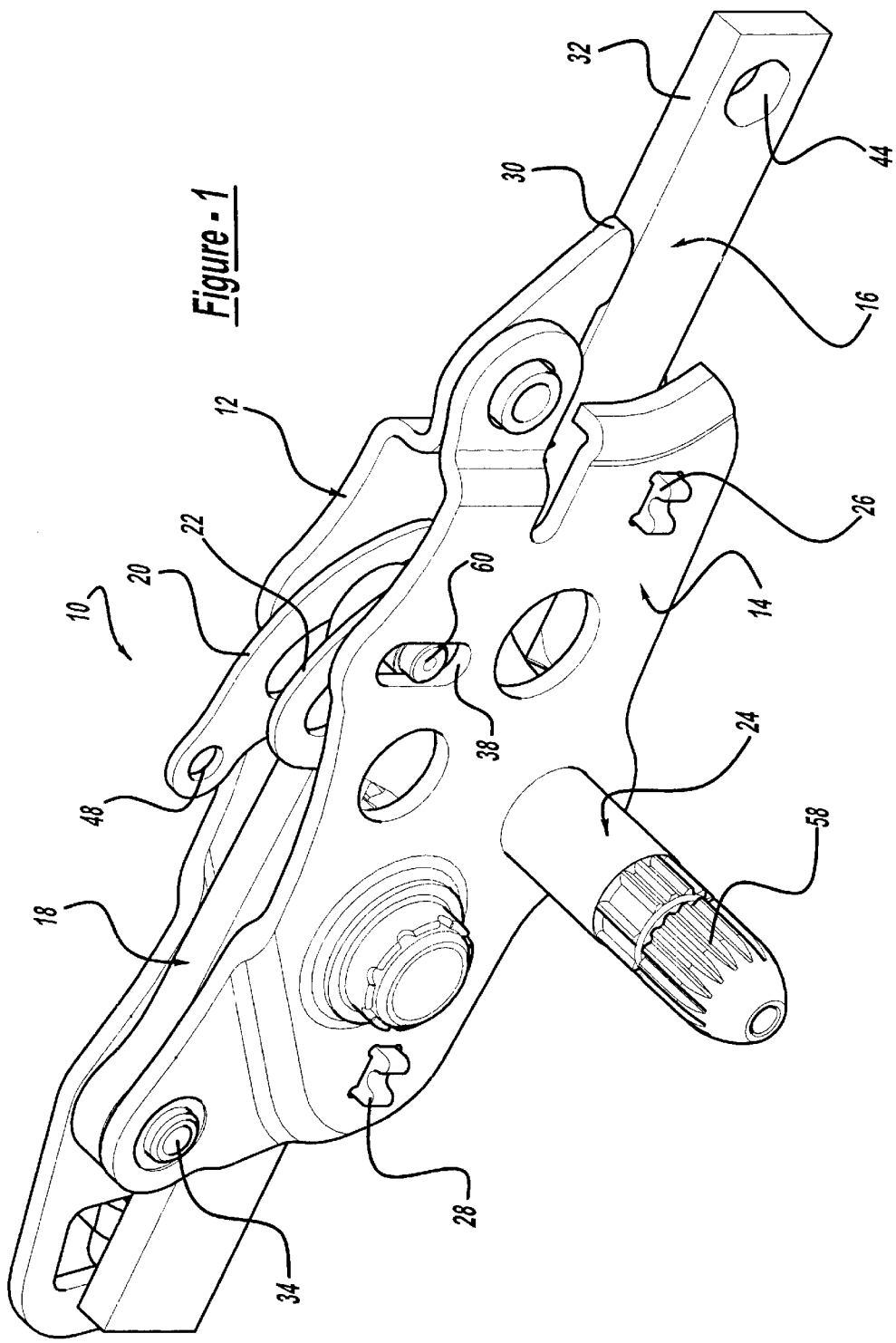
FIG. 1 is a perspective view of a linear adjustment mechanism according to the present invention.
Figure 2:
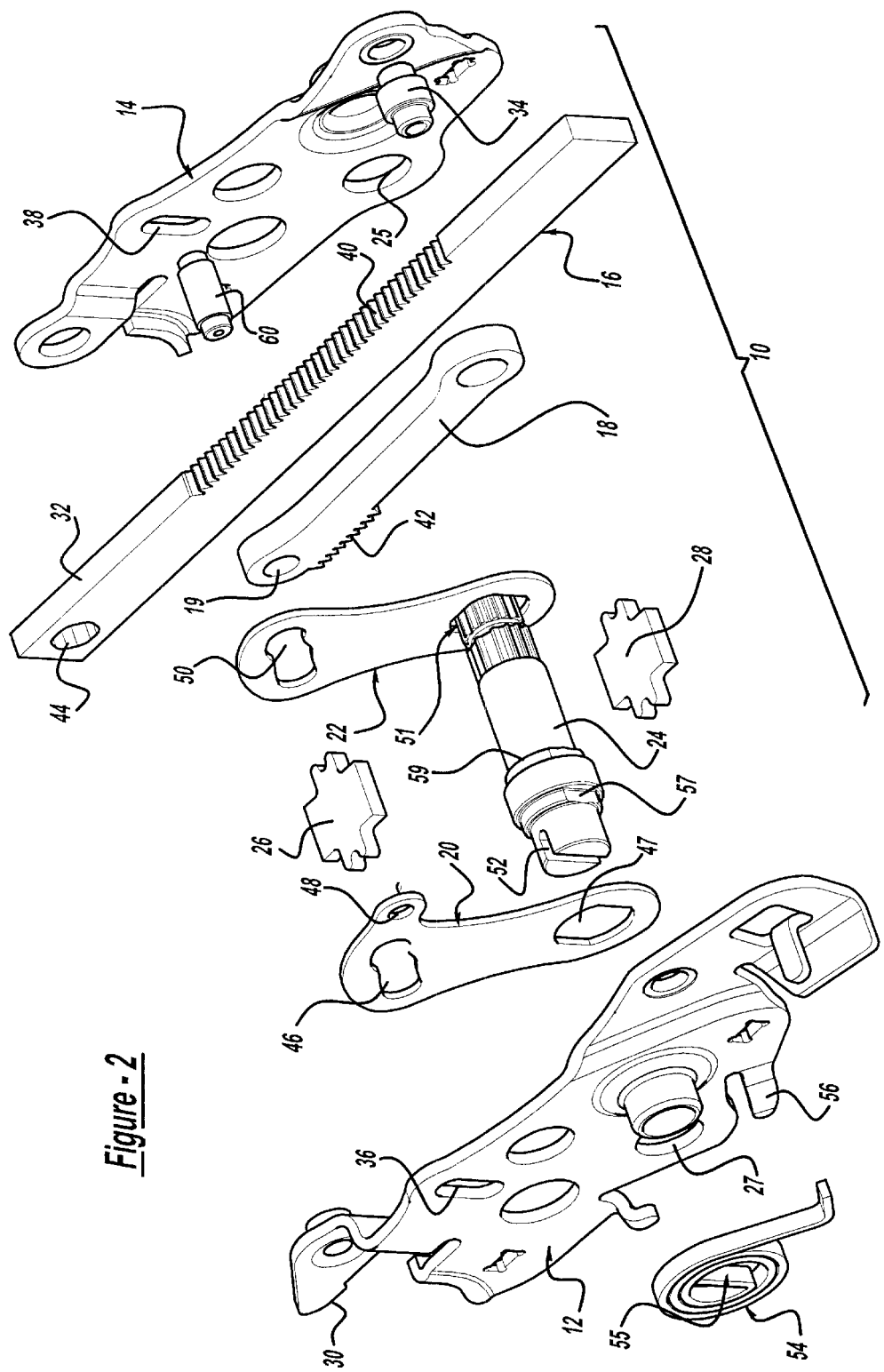
FIG. 2 is an exploded view detailing individual components of the linear adjustment mechanism of FIG. 1.

With reference to FIGS. 1 and 2, a linear adjustment mechanism 10 will be described in detail. The linear adjustment mechanism 10 generally includes inner and outer plates 12,14, a recliner rod or bar rack 16, a pawl 18, inner and outer cam plates 20,22 and a spindle 24.

The inner and outer plates 12,14 slidably support the bar rack 16 and pivotally support the pawl 18. More particularly, first and second bar supports 26,28 are supported between the inner and outer plates 12,14 for slidably supporting the bar rack 16 therebetween. Additionally, the inner plate 12 forms an upper bar support 30 for guiding a top face 32 of the bar rack 16. The inner and outer plates 12,14 further include vertically disposed inner and outer pawl pin slots 36,38, respectively for guiding the pawl 18 with respect to the cam plates 20,22.

The pawl 18 is pivotally supported on a first end by a pawl rivet 34 extending between the inner and outer plates 12,14 and is positioned above and generally parallel to the bar rack 16. The bar rack 16 includes a toothed portion 40 that selectively interfaces with a toothed portion 42 of the pawl 18, which moves between engaged and disengaged positions. The bar rack 16 further includes an aperture 44 for pivotally connecting to a support arm 114 of a seatback, as will be described below. The pawl 18 selectively locks the bar rack 16 to prohibit sliding movement of the bar rack 16 between the inner and outer plates 12,14. The toothed portions 40,42 of both the pawl and the bar rack 16 are configured such that the teeth are numerous and small. As a result, the pawl 18 and bar rack 16 engagement is capable of fine adjustment.

The inner cam plate 20 is pivotally supported between the inner and outer plates 12,14 on the inner plate side of the pawl 18 and includes an inner cam slot 46 and a keyed slot 47. The inner cam plate 20 also has a cable mount 48 formed in an upper portion. The outer cam plate 22 is pivotally supported between the inner and outer plates 12,14 on the outer plate side of the pawl 18 and includes an outer cam slot 50 and a keyed slot 51. The inner and outer cam slots 46,50 are identical in form (generally peanut-shaped) and run at an angle on the inner and outer cam plates 20,22 (see FIGS. 2 and 3). The inner and outer cam plates 20,22 are supported on, and fixed for rotation with, the spindle 24 through reception of the spindle 24 in the keyed slots 49, 51.

Figure 3:
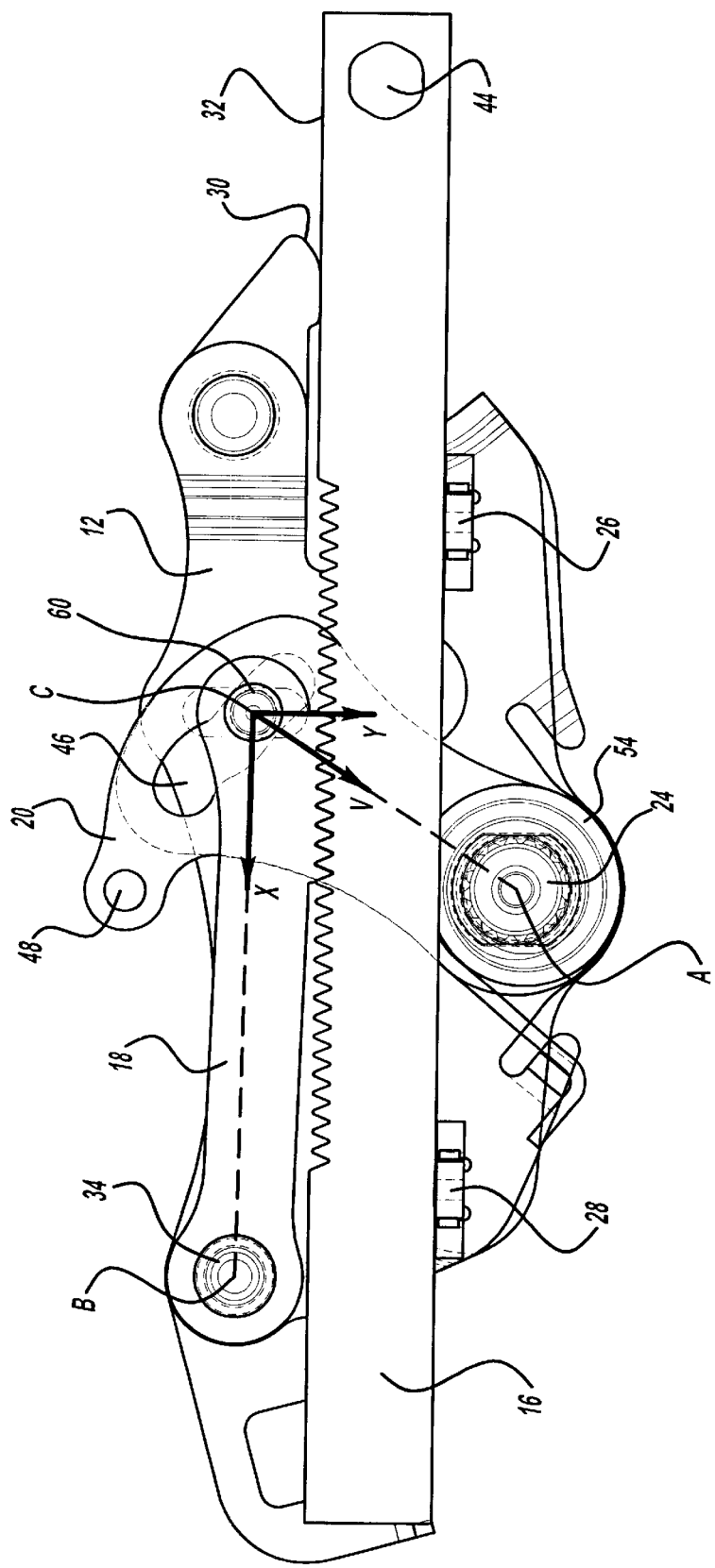
FIG. 3 is a side view of the linear adjustment mechanism of FIGS. 1 and 2 in a locked position.
Figure 4:
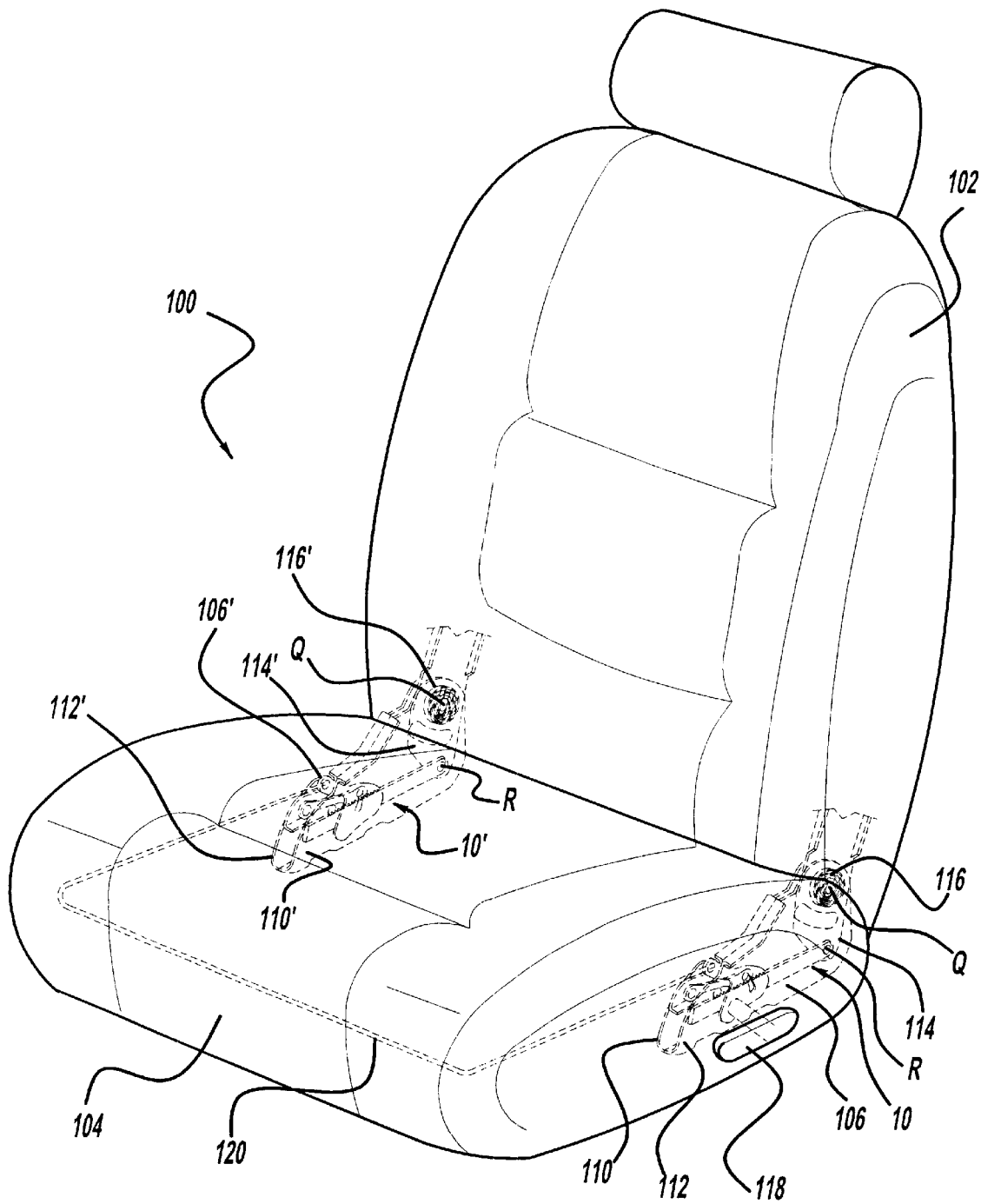
FIG. 4 is a perspective view of a seat assembly implementing control-and-remote side linear recliner assemblies according to the present invention.

The spindle 24 is mounted in spindle holes 25,27 which, rotatably support the spindle 24 between the inner and outer plates 12,14. A first end of the spindle 24 includes a spring groove 52 for securing a biasing member or cam return spring 54. The cam return spring 54 is a coil-type spring commonly known in the art, however, other springs such as linear, can be substituted therefor. An inner end 55 of the cam return spring 54 is secured by the spring groove 52 of the spindle 24 and an outer end of the cam return spring 54 is secured by a spring holder 56 formed on the inner plate 12. The cam return spring 54 biases the spindle 24 in a first rotational direction (counter-clockwise as shown in FIG. 3), thus biasing inner and outer cam plates 20,22 in the first rotational direction. A second end of the spindle 24 includes a splined portion 58 (best shown in FIG. 1) for securing a handle, as will be described below. Preferably, the handle is pulled upwardly by an operator for rotating the spindle 24 against the biasing force of the cam return spring 54. A pair of keyed shoulders 57, 59 are disposed intermediately along the spindle 24. The keyed shoulders 57, 59 respectively register in the keyed slots 47, 51 of the inner and outer cam plates 20, 22 to cause rotation of the inner and outer cam plates 20, 22 with the spindle 24.

The pawl 18 is pivotally mounted at a first end by the pivot pin 34 and supports a pawl pin 60 in an aperture 19 at a second end. The pawl pin 60 extends through the inner and outer cam slots 46,50 of the inner and outer cam plates 20,22. As such, the pawl pin 60 is slidable along the generally peanut-shaped inner and outer cam slots 46,50. Additionally, the pawl pin 60 includes reduced-diameter outer ends slidably supported in the inner and outer pawl pin slots 36,38 of inner and outer plates 12,14. The position of the pawl pin 60 in the cam slots 46, 50, dictates the position of the pawl 18. Due to the rotational biasing force exerted by the cam return spring 54, the inner and outer cam plates 20,22 bias the pawl pin 60, and thus the pawl 18, toward the engaged position, forcing the pawl 18 into meshed engagement with the bar rack 16.

To achieve almost zero free-play in the linear adjustment mechanism 10 the clearances in the pawl 18 and pawl rivet. 34 interface must be eliminated. According to the present invention, this is accomplished through the novel configuration of the linear adjustment mechanism 10. With particular reference to FIG. 3, the inner and outer cam plates 20,22 are rotatable about an axis 'A' of the spindle 24 and the pawl 18 is rotatable about an axis 'B' of the pawl rivet 34. As described above, the inner and outer cam plates 20,22 are biased in a counter-clockwise direction by the cam return spring 54. As such, the cam surface of the inner and outer cam slots 46,50 bias the pawl pin 60 toward the bar rack 16. The force exerted through the cam surface of the inner and outer cam slots 46,50, against the pawl pin 60, can be traced from a center point 'C' of the pawl pin 60 and is designated by a vector 'V'. The vector V is directed toward the pivot point A and is made up of component vectors 'X' and 'Y'. Accordingly, any free-play (causing the aforementioned seatback chucking) associated with pivot point A is eliminated. As will readily be appreciated by those skilled in the art, component force vector X is directed substantially toward pivot point B. Consequently, any free-play (causing the aforementioned seatback chucking) associated with pivot point B is eliminated. Additionally, the 'Y' component force vector is directed generally perpendicular to the interface between the pawl 18 and the bar rack 16, thereby ensuring that the toothed portion 42 of the pawl 18 firmly meshes with the toothed portion 40 of the bar rack 16. The biased cam plates 20,22 have increased leverage to resist any separating force of the pawl 18, thereby increasing the load carrying capacity of the linear adjustment mechanism 10.

With reference to FIGS. 3 through 6, the implementation of the linear adjustment mechanism 10 in a linear recliner assembly of a seat assembly 100, will be described in detail. As shown, the seat assembly 100 includes a seatback 102, a seat 104, and both control and remote side linear recliner assemblies 106,106' each including a linear adjustment mechanism, 10,10' for selectively reclining the seatback 102 relative to the seat 104. It should be noted that control and remote side linear recliner assemblies 106,106' are nearly identical in construction and, therefore, like reference numerals will be used to describe identical components of each. However, reference numerals describing the remote side linear recliner assembly 106' will include a prime (') symbol.

Figure 5:
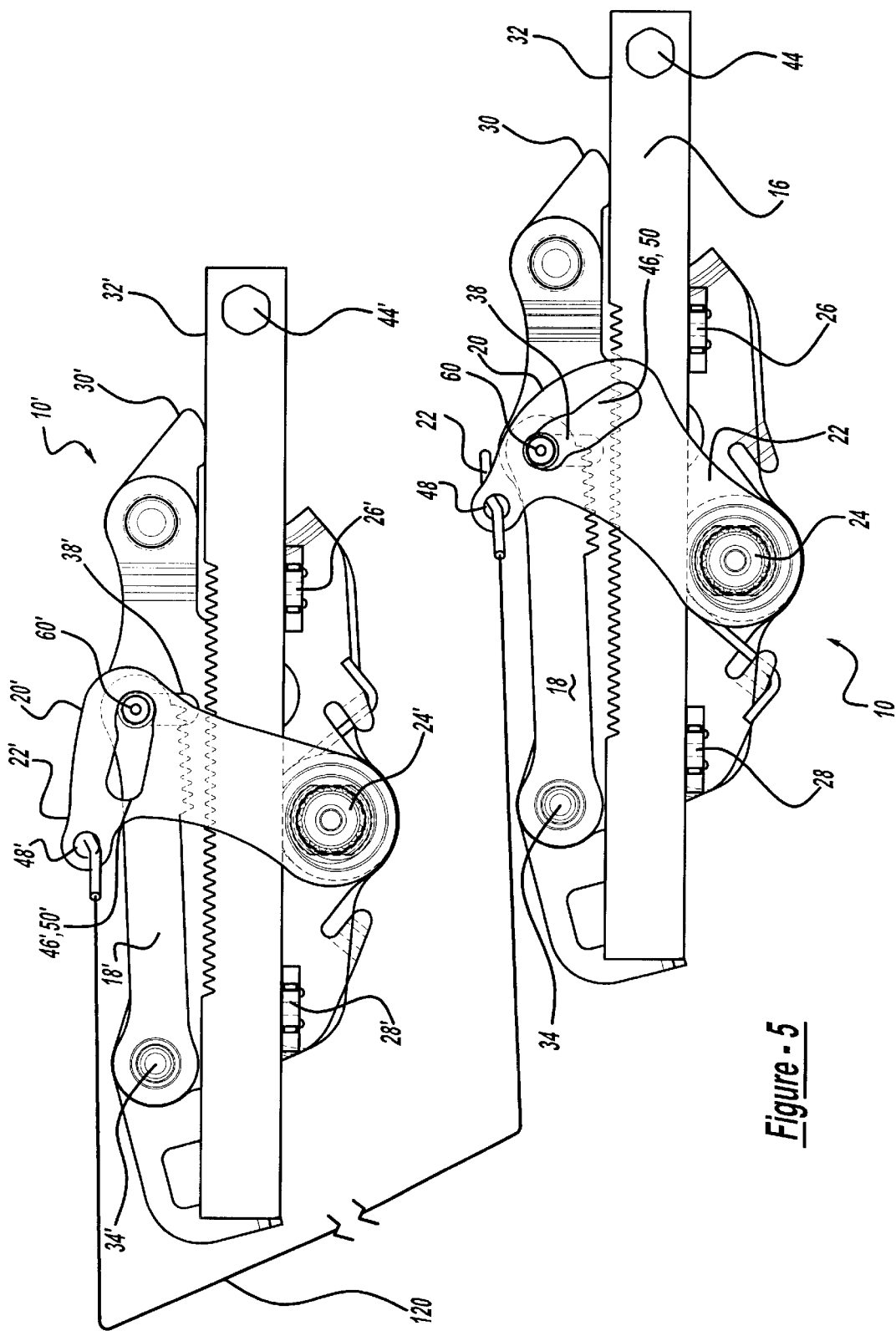
FIG. 5 is a schematic view illustrating the relationship of the linear recliner assemblies of FIG. 4.

There is one notable distinction between the control and remote side linear recliner assemblies 106,106'. The inner and outer cam slots 46',50' of the remote side linear adjustment mechanism 10' run across the inner and outer cam plates 20',22' at an angle opposite to that previously described for the inner and outer cam slots 46,50 of the control side linear adjustment mechanism 10. This is best shown in FIG. 5, which shows both the control side inner cam plate 20 and the remote side inner cam plate 20'. As a result when the pawl 18 of the control side is released by rotating the inner and outer cam plates 20,22 in a first rotational direction (clockwise as shown), the pawl 18 of the remote side is released by rotating the inner and outer cam plates 20',22' in a second opposite direction (counter-clockwise as shown).

The linear recliner assemblies 106,106' each include inner and outer supports 110,110' and 112,112', respectively, and arms 114,114' pivotally supported between the inner and outer supports 110,110',112,112' about a first pivot axis Q. Arm return springs, 116'116' which. are preferably coil springs, pivotally bias the arms 114,114', in a first rotational direction about the first pivot axis Q. Further, both the control and remote side linear recliner assemblies 106,106' include linear adjustment mechanisms 10,10', as noted above. A bottom portion of each arm 114,114' is pivotally attached to an end of the respective bar rack 16,16' about a second pivot axis R at the aperture 44,44' of each bar rack 16,16'. The control side linear recliner assembly 106 also includes a handle 118 attached to the splined portion 58 of the linear adjustment mechanism 10 for actuating the inner and outer cam plates 20,22. Additionally, a cable 120 is attached to the cable mount 48 of the inner cam plate 20 of the control side linear adjustment mechanism 10. and runs around a bottom surface of the seat 104 for linking with the cable mount 48' of the inner cam plate 20' of the remote side linear adjustment mechanism 10'.

Figure 6:
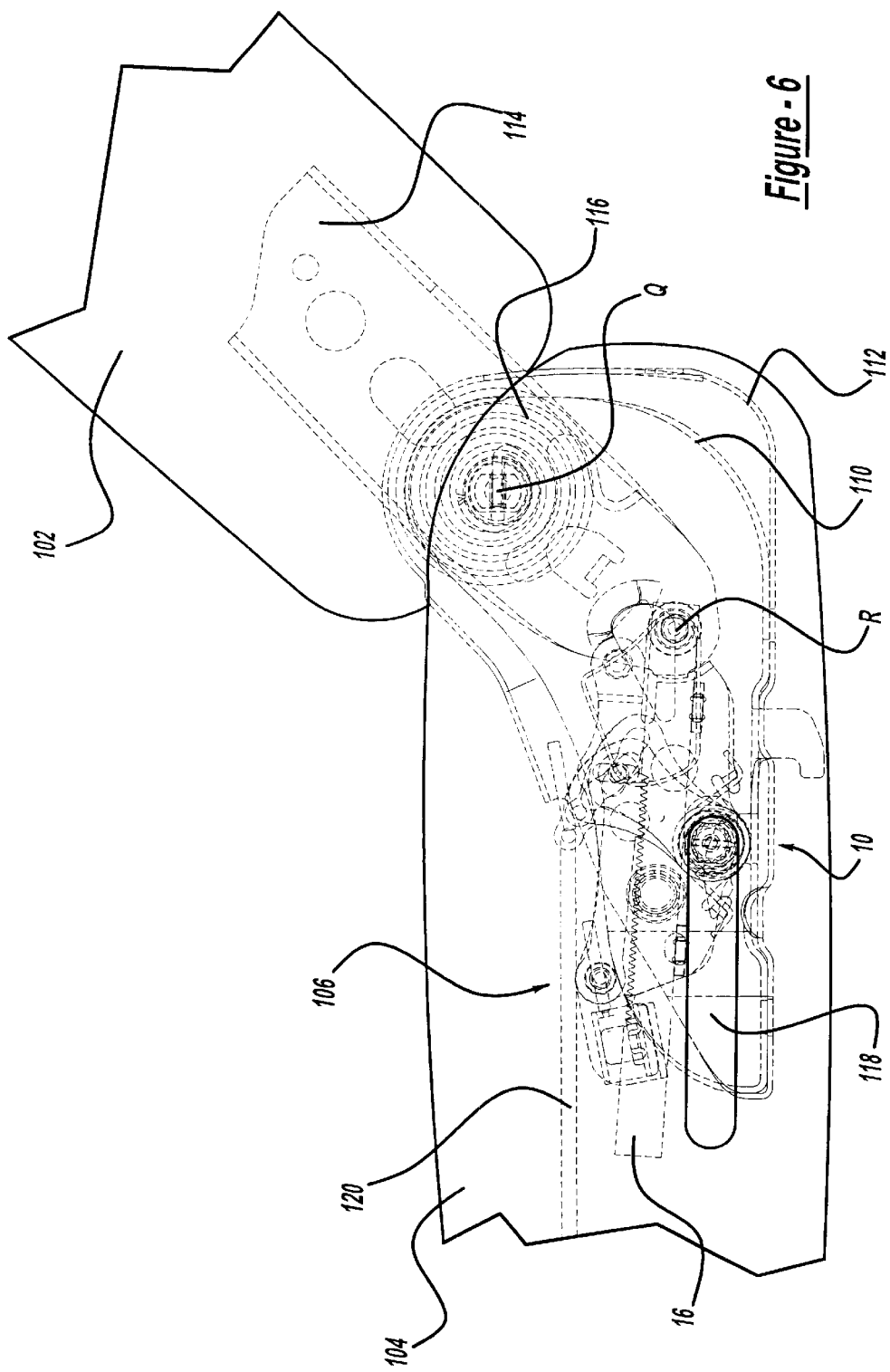
FIG. 6 is a side view of the control-side linear recliner assembly of the seat assembly of FIG. 4.

With particular reference to FIGS. 3 and 6, operation of the seat assembly 100 will be described in detail. At the outset, the seatback 102 rests at a reclined position relative to the seat. An alternative reclined position of the seatback 102 relative to the seat 104 may be achieved by an operator pulling the handle 118. in a clockwise direction. As described previously, clockwise rotation of the handle 118 results in clockwise rotation of the control side inner and outer cam plates 20,22 against the bias of spring 54. As a result, the control side pawl pin 60 is biased upward by the inner and outer cam slots 46,50, thus pulling the pawl 18 out of engagement with the bar rack 16. Concurrently, the cable 120 is pulled as a result of the clockwise pivoting of the inner cam plate 20. The cable 120 subsequently pulls on the remote side inner cam plate 20', thus causing counter-clockwise rotation of the remote side inner and outer cam plates 20',22' against the bias of spring 54'. As a result, the counter-clockwise rotation of the remote side inner and outer cam plates 20',22' causes disengagement of the remote side pawl 18' with the bar rack 16'.

With both the control and remote side bar racks 16,16' out of locking engagement with the pawls 18,18', the seatback 102 is free to pivot about first pivot axis Q. Due to the biasing force of each arm return spring 116,116' the arms 114,114' pivot in the first rotational direction (counter-clockwise as shown), whereby the seatback 102 moves toward a dumped position. To achieve pivoting of the arms 114,114' in an opposite rotational direction (clockwise) an operator must apply a counter-biasing force greater than the biasing force of the arm return springs 116,116'. As the arms 114,114' of the control and remote side linear recliner assemblies 106,106' are caused to pivot, the respective bar racks 16,16' slide accordingly. The seatback 102, being attached to both arms 114,114' of the linear recliner assemblies 106,106', can be locked at a desired recline position by releasing the handle 118 of the control side linear recliner assembly 106. Once the handle is released, the inner and outer cam plates 20,22 of the control side rotate counter-clockwise due to the biasing force of the cam return spring 54. As such, tension is relieved from the cable 120 and the remote side inner and outer cam plates 20',22' rotate clockwise, with the biasing force of the cam return spring 54'. As a result, both the control and remote side bar racks 16,16' again achieve locked engagement with their respective paws 18,18' and the seatback 102 is held in the desired recline position.

The novel configuration of the seat assembly 100, and particularly the linear adjustment mechanism 10,10' serves to virtually eliminate any clearances between the various components. As such, chucking of the seatback 102 relative to the seat 104 is greatly reduced, enhancing overall occupant comfort. The novel configuration also results in increased strength of the overall seat assembly 100 enhancing crash performance.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A linear adjustment mechanism comprising:
    a recliner rod slidably supported by a housing;
    a pawl rotatably supported on a pawl pivot supported by said housing, said pawl selectively engaging said recliner rod on a first surface thereof to lock said recliner rod in one of a plurality of positions relative to said housing;
    a cam operatively engaging said pawl via a cam surface on said cam to move said pawl into an engaged position with said recliner rod when said cam is moved from an unlocking position to a locking position; and
    a spring connected to said cam for biasing said cam toward said locking position;
    wherein said spring and cam impart a locking force on said pawl, said locking force having a first force component normal to said first surface of said recliner rod and a second force component substantially aligned with said pawl through said pawl pivot.

2. The linear adjustment mechanism according to claim 1, wherein said cam is rotatably supported in said housing about a cam pivot for movement from said unlocking position to said locking position.

3. The linear adjustment mechanism according to claim 2, further comprising a pawl pin extending from said pawl and a cam slot formed in said cam, said cam slot slidably receiving said pawl pin to cause said pawl to selectively engage said recliner rod upon rotation of said cam.

4. The linear adjustment mechanism according to claim 1, wherein said recliner rod includes a tooth portion adapted to mesh with a complimentary tooth portion of said pawl when selectively engaged.

5. A recliner assembly for implementation with a seat assembly, said recliner assembly comprising:

- a support structure for connecting a seatback to a seat bottom;
- an arm rotatably supported by said support structure;
- a linear adjustment mechanism operable to selectively pivot said arm relative said support structure and including:
  - a recliner rod slidably supported by a housing;
  - a pawl rotatably supported on a pawl pivot supported by said housing, said pawl selectively engaging said recliner rod on a first surface thereof to lock said recliner rod in one of a plurality of positions relative to said housing;
  - a cam operatively engaging said pawl via a cam surface on said cam to move said pawl into an engaged position with said recliner rod when said cam is moved from an unlocking position to a locking position; and
  - a spring connected to said cam for biasing said cam toward said locking position.

6. The recliner assembly according to claim 5, wherein said cam is rotatably supported in said housing about a cam pivot for movement from said unlocking position to said locking position.

7. The recliner assembly according to claim 6, further comprising a pawl pin extending from said pawl and a cam slot formed in said cam, said cam slot slidably receiving said pawl pin to cause said pawl to selectively engage said recliner rod upon rotation of said cam.

8. The recliner assembly according to claim 5, wherein said recliner rod includes a tooth portion adapted to mesh with a complimentary tooth portion of said pawl when selectively engaged.

9. The recliner assembly according to claim 5, further comprising a coil spring coaxially disposed between said arm and said support structure to bias said arm toward said support structure.

* * * * *